(12) United States Patent
Yamakawa

(10) Patent No.: US 8,379,326 B2
(45) Date of Patent: Feb. 19, 2013

(54) IMAGING LENS AND IMAGING APPARATUS

(75) Inventor: Hiromitsu Yamakawa, Saitama (JP)

(73) Assignee: Fujifilm Corporation, Tokyo (JP)

( * ) Notice: Subject to any disclaimer, the term of this patent is extended or adjusted under 35 U.S.C. 154(b) by 110 days.

(21) Appl. No.: 13/020,146

(22) Filed: Feb. 3, 2011

(65) Prior Publication Data
US 2011/0188133 A1 Aug. 4, 2011

(30) Foreign Application Priority Data
Feb. 4, 2010 (JP) ................................ 2010-022927

(51) Int. Cl.
*G02B 9/34* (2006.01)
*G02B 3/02* (2006.01)
(52) U.S. Cl. ........................................ 359/715; 359/781
(58) Field of Classification Search .................. 359/708, 359/713–715, 754–756, 762, 763, 770, 771, 359/781
See application file for complete search history.

(56) References Cited

U.S. PATENT DOCUMENTS

| | | | |
|---|---|---|---|
| 7,280,289 B2 | 10/2007 | Yamakawa | |
| 7,375,906 B2 | 5/2008 | Hirose et al. | |
| 7,518,809 B2 | 4/2009 | Yamakawa et al. | |
| 2009/0296234 A1 * | 12/2009 | Asami | 359/713 |

FOREIGN PATENT DOCUMENTS

| | | |
|---|---|---|
| EP | 2009476 | 12/2008 |
| JP | 2002-244031 | 8/2002 |
| JP | 2005-227426 | 8/2005 |

OTHER PUBLICATIONS

Extended European Search Report dated Feb. 20, 2012, Application No. 11153103.4.

* cited by examiner

*Primary Examiner* — Darryl J Collins
(74) *Attorney, Agent, or Firm* — Young & Thompson

(57) ABSTRACT

An imaging lens includes a first lens, a second lens, a third lens, an aperture stop, and a fourth lens, sequentially arranged from the object-side of the imaging lens. The first lens has negative power, and an object-side surface is convex and an image-side surface is concave. Both surfaces of the second lens are aspheric, and in the vicinity of the optical axis, the second lens has negative power, and the object-side surface is convex and the image-side surface is concave. Both surfaces of the third lens are aspheric, and in the vicinity of the optical axis, the third lens has positive power, and the object-side surface is convex, and the image-side surface is concave. Both surfaces of the fourth lens are aspheric, and in the vicinity of the optical axis, the fourth lens has positive power, and the object-side surface is concave, and the image-side surface is convex.

10 Claims, 8 Drawing Sheets

EXAMPLE 3

EXAMPLE 1

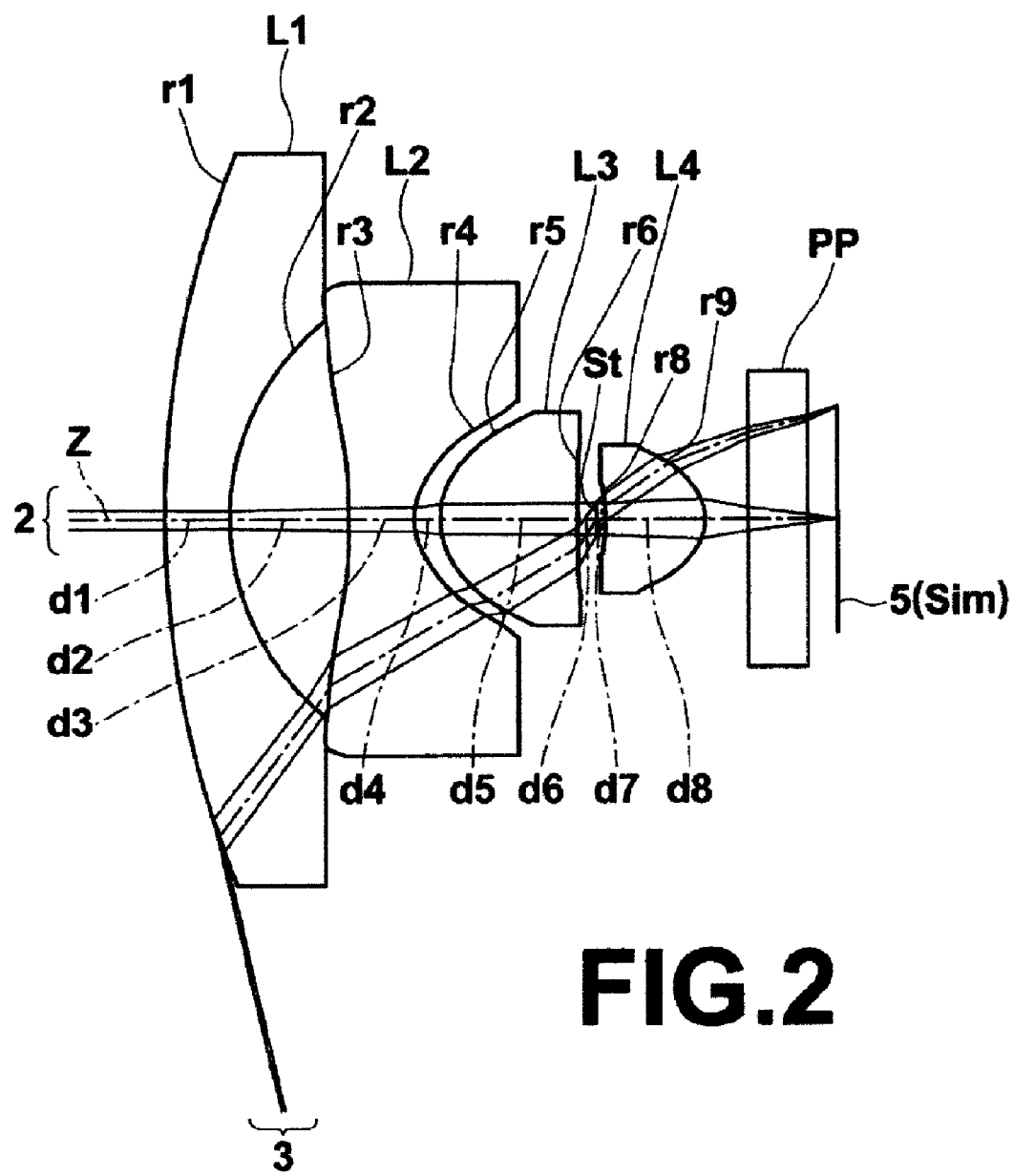

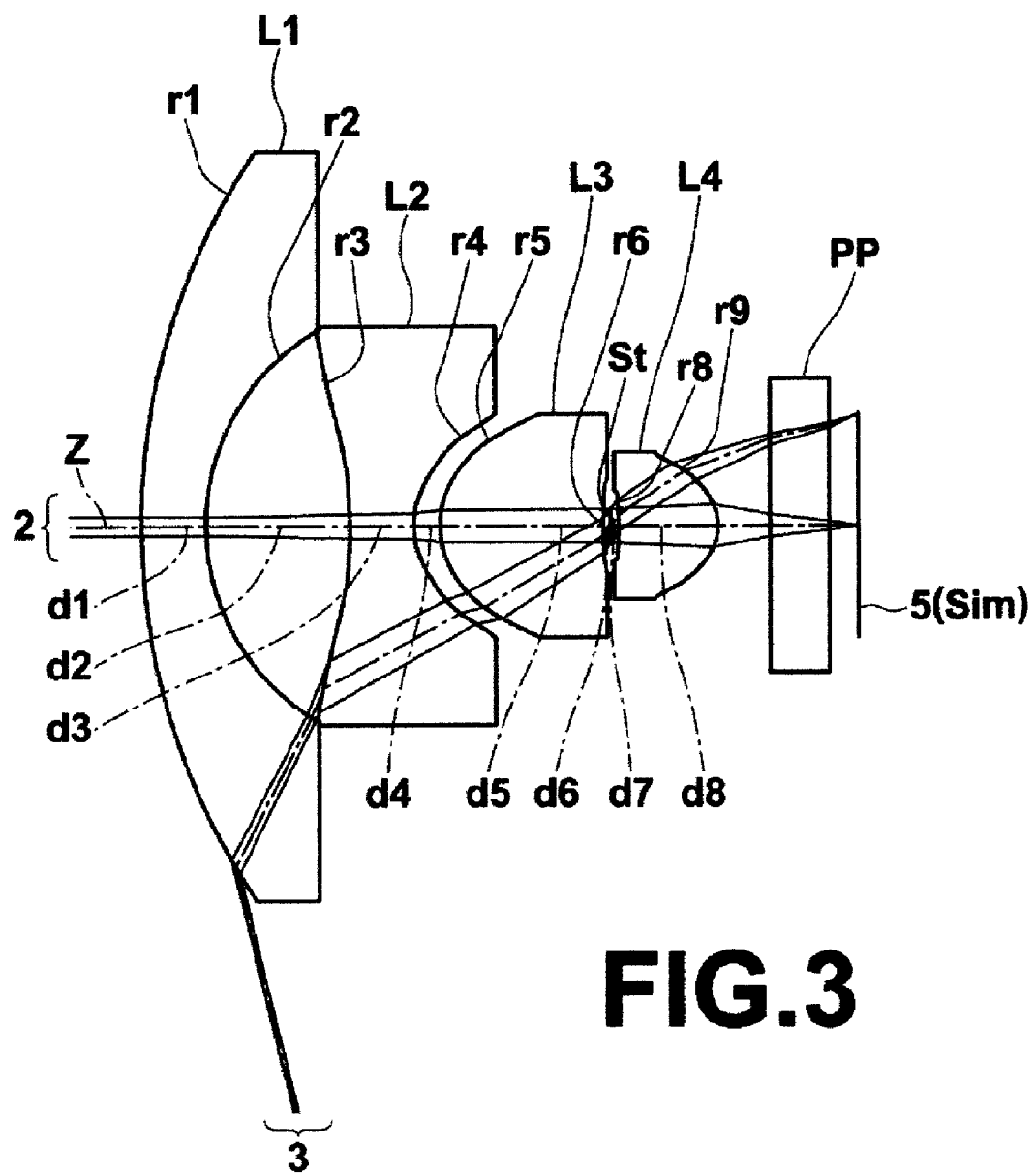

EXAMPLE 1
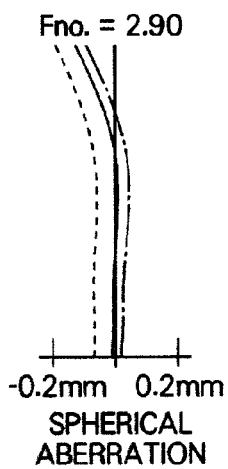
Fno. = 2.90
-0.2mm 0.2mm
SPHERICAL ABERRATION
FIG.4A
— e-LINE
---- g-LINE
—·— C-LINE
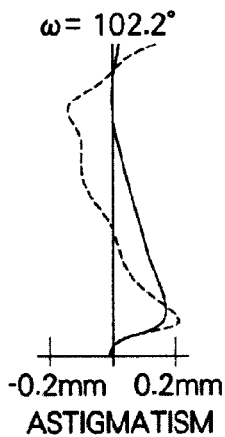
ω= 102.2°
-0.2mm 0.2mm
ASTIGMATISM
FIG.4B
— SAGITTAL
---- TANGENTIAL
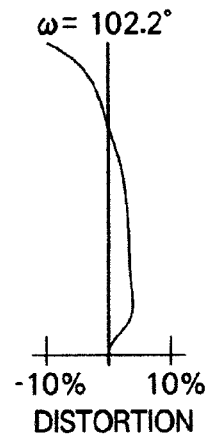
ω= 102.2°
-10% 10%
DISTORTION
FIG.4C
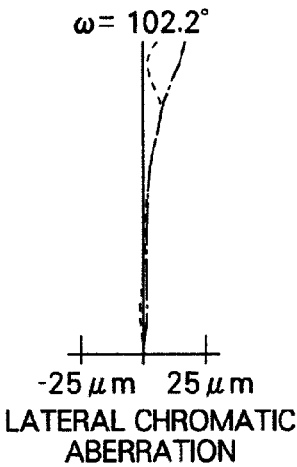
ω= 102.2°
-25μm 25μm
LATERAL CHROMATIC ABERRATION
FIG.4D
---- g-LINE
—·— C-LINE
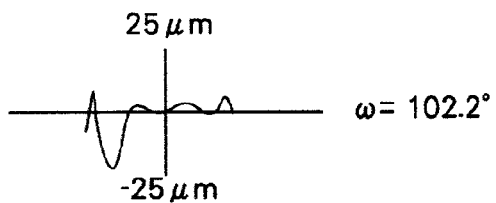
ω= 102.2° FIG.4E
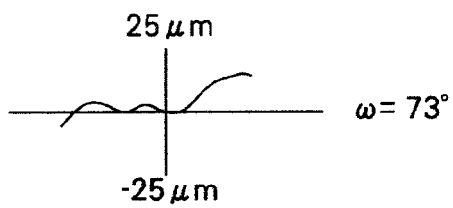
ω= 73° FIG.4F
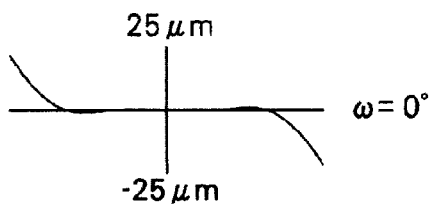
ω= 0° FIG.4G

EXAMPLE 2
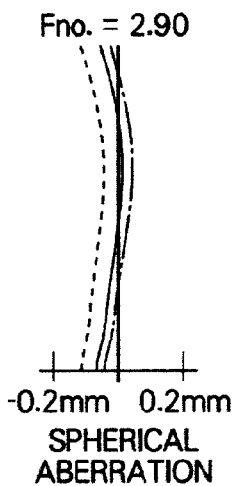
-0.2mm 0.2mm
SPHERICAL
ABERRATION
FIG.5A
Fno. = 2.90
— e-LINE
---- g-LINE
—·— C-LINE
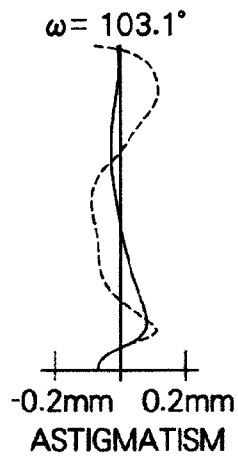
-0.2mm 0.2mm
ASTIGMATISM
FIG.5B
ω = 103.1°
— SAGITTAL
---- TANGENTIAL
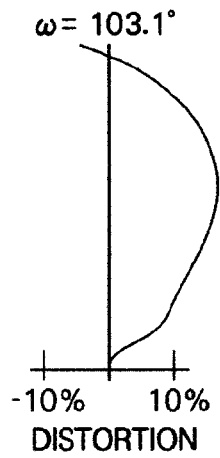
-10% 10%
DISTORTION
FIG.5C
ω = 103.1°
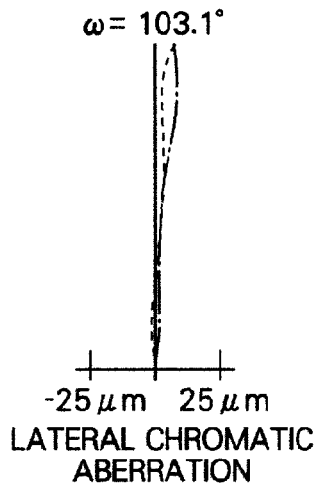
-25μm 25μm
LATERAL CHROMATIC
ABERRATION
FIG.5D
ω = 103.1°
---- g-LINE
—·— C-LINE
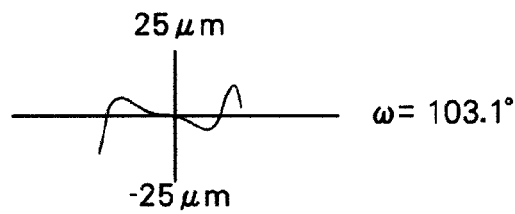
ω = 103.1° FIG.5E
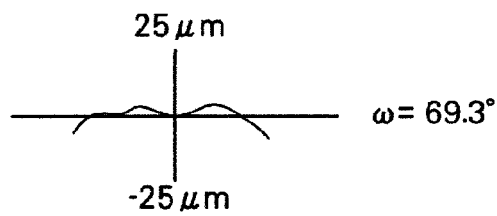
ω = 69.3° FIG.5F
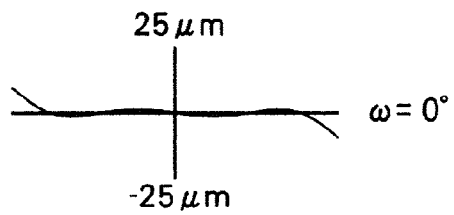
ω = 0° FIG.5G

EXAMPLE 3
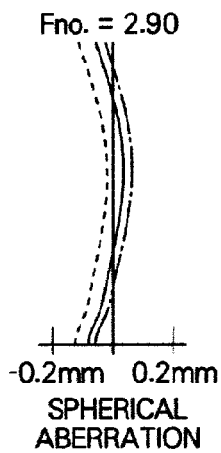
Fno. = 2.90
-0.2mm 0.2mm
SPHERICAL
ABERRATION
FIG.6A
— e-LINE
----- g-LINE
—·— C-LINE
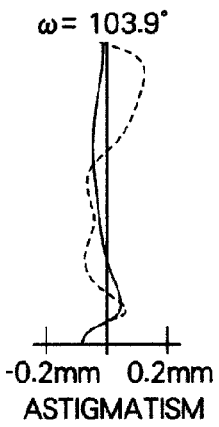
ω = 103.9°
-0.2mm 0.2mm
ASTIGMATISM
FIG.6B
— SAGITTAL
----- TANGENTIAL
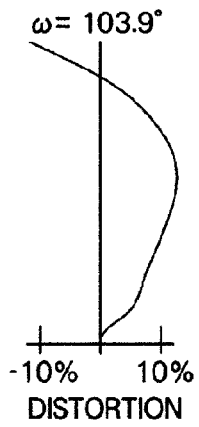
ω = 103.9°
-10% 10%
DISTORTION
FIG.6C
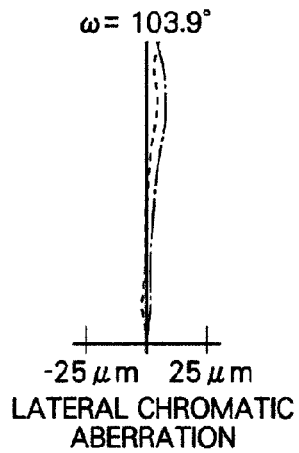
ω = 103.9°
-25μm 25μm
LATERAL CHROMATIC
ABERRATION
FIG.6D
----- g-LINE
—·— C-LINE
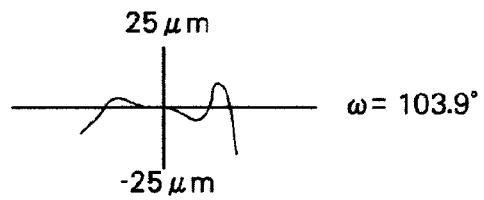
ω = 103.9°  FIG.6E
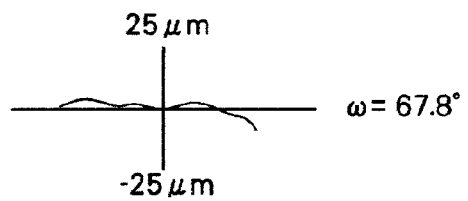
ω = 67.8°  FIG.6F
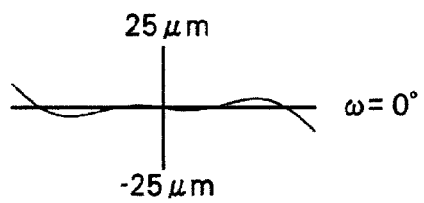
ω = 0°  FIG.6G

EXAMPLE 1

EXAMPLE 2

EXAMPLE 3

IMAGING LENS AND IMAGING APPARATUS

BACKGROUND OF THE INVENTION

1. Field of the Invention

The present invention relates to an imaging lens and an imaging apparatus. In particular, the present invention relates to a wide-angle imaging lens that is appropriate for use in an in-vehicle camera, a monitor camera, or the like that uses an imaging device, such as a CCD (Charge Coupled Device) and a CMOS (Complementary Metal Oxide Semiconductor). Further, the present invention relates to an imaging apparatus including the imaging lens.

2. Description of the Related Art

In recent years, the size of an imaging device such as a CCD and a CMOS became very small, and the resolution of the imaging device became very high. Therefore, the size and the weight of the main body of imaging equipment and an imaging lens mounted on the imaging equipment also need to be reduced. Meanwhile, imaging lenses used in the in-vehicle camera (on-vehicle camera), the monitor camera (or a surveillance camera) and the like need to have excellent weather-resistance characteristics. Further, the imaging lenses need to have wide angles of view and excellent optical performance so that an excellent view is ensured for a wide range.

Further, since it is desirable to reduce the cost for producing the imaging lens in the aforementioned fields, an optical system composed of a small number of lenses is desirable. Conventionally, for example, Japanese Unexamined Patent Publication No. 2002-244031 (Patent Document 1), U.S. Pat. No. 7,280,289 (Patent Document 2), U.S. Pat. No. 7,375,906 (Patent Document 3), Japanese Unexamined Patent Publication No. 2005-227426 (Patent Document 4), and U.S. Pat. No. 7,518,809 (Patent Document 5) disclose imaging lenses, each composed of four lenses, in the aforementioned fields.

Meanwhile, in the fields of the in-vehicle camera, the monitor camera, and the like, a demand for wider angle lenses increased in recent years. For example, lenses having full angles of view exceeding 180° became desirable. Further, as the size of the imaging device became smaller, and the resolution of the imaging device became higher in recent years, an imaging lens that has high resolution and high optical performance that enables obtainment of excellent images for a wide image formation range became desirable. However, in the conventional lens system, it was difficult to realize an imaging lens that has a wider angle of view and high optical performance, and which can satisfy the demand in recent years, while the lens system is constructed at low cost and in small size.

Patent Document 1 describes, as a wide angle lens in Example 3 thereof, a lens system composed of four lenses of first through fourth lenses, which are sequentially arranged from the object side of the wide angle lens. In the wide angle lens, an aperture stop is arranged between the third lens and the fourth lens. Patent Document 1 is silent about the F-number of the lens system and the angle of view of the lens system. However, since the refractive index of the first lens is approximately 1.52, and the negative power of the first lens and the negative power of the second lens are relatively weak, it is improbable that the lens system can cope with a specification in which a full angle of view exceeds 180°.

The full angles of views of the lenses disclosed in Patent Documents 2 and 3 are in the range of approximately 140° to 165° and in the range of approximately 152° to 164°, respectively. Therefore, they do not satisfy a need for a wider angle lens that has a full angle of view exceeding 180° in recent years. Further, in the lens disclosed in Patent Document 4, the F-number is in the range of 2.5 to 2.8, and the full angle of view is greater than or equal to 180°. However, when a projection method, in which an ideal image height is represented by $2 \times f \times \tan(\phi/2)$ using focal length f of the entire lens system and half angle $\phi$ of view, is adopted, distortion (distortion aberrations) sharply increases on the minus side when the half angle of view exceeds 80°. Therefore, the lens disclosed in Patent Document 4 has a disadvantage that an image in the most peripheral area thereof becomes small. Further, Patent Document 5 discloses an example in which a full angle of view is close to 190°. In Patent Document 5, both of the distortion and the lateral chromatic aberration of the lens are corrected in an excellent manner. However, astigmatism remains. Further, when the lens is used in combination with a higher-resolution imaging device, a deeper depth of field is required in some cases.

SUMMARY OF THE INVENTION

In view of the foregoing circumstances, it is an object of the present invention to provide a small imaging lens that can be produced at low cost, but which can realize a wider angle of view and higher optical performance. Further, it is another object of the present invention to provide an imaging apparatus including the imaging lens.

An imaging lens of the present invention is an imaging lens of the present invention is an imaging lens comprising:

a first lens:
a second lens;
a third lens;
an aperture stop; and
a fourth lens, which are sequentially arranged from the object side of the imaging lens, wherein the first lens has negative power, and an object-side surface of the first lens is convex and an image-side surface of the first lens is concave, and wherein an object-side surface and an image-side surface of the second lens are aspheric, and the second lens has negative power in the vicinity of the optical axis of the imaging lens, and the object-side surface of the second lens is convex in the vicinity of the optical axis, and the image-side surface of the second lens is concave in the vicinity of the optical axis, and wherein an object-side surface and an image-side surface of the third lens are aspheric, and the third lens has positive power in the vicinity of the optical axis of the imaging lens, and the object-side surface of the third lens is convex in the vicinity of the optical axis, and the image-side surface of the third lens is concave in the vicinity of the optical axis, and wherein an object-side surface and an image-side surface of the fourth lens are aspheric, and the fourth lens has positive power in the vicinity of the optical axis of the imaging lens, and the object-side surface of the fourth lens is concave in the vicinity of the optical axis, and the image-side surface of the fourth lens is convex in the vicinity of the optical axis.

In the descriptions of the first lens in the imaging lens of the present invention, the expression "the first lens has negative power, and an object-side surface of the first lens is convex and an image-side surface of the first lens is concave" refers to a paraxial region of the first lens when the first lens is an aspheric lens. Further, the expression "in the vicinity of the optical axis" is used in the same meaning as the paraxial region.

In the imaging lens of the present invention, it is desirable that the following formulas (1) through (6) are satisfied:

$$-11.0 < f1/f < -8.0 \quad (1);$$

$$0.16 < d2/L < 0.30 \quad (2);$$

$$0.02 < d4/L < 0.05 \quad (3);$$

$$-1.2 < f2/f3 < -0.5 \quad (4);$$

$$2.0 < L/f34 < 6.0 \quad (5); \text{ and}$$

$$1.0 < r5/r4 < 2.0 \quad (6), \text{ where}$$

f: focal length of the entire system of the imaging lens,
f1: focal length of the first lens,
f2: focal length of the second lens,
f3: focal length of the third lens,
f34: combined focal length of the third lens and the fourth lens,
d2: distance between the first lens and the second lens on the optical axis,
d4: distance between the second lens and the third lens on the optical axis,
r4: paraxial curvature radius of the image-side surface of the second lens,
r5: paraxial curvature radius of the object-side surface of the third lens, and
L: length from the vertex of the object-side surface of the first lens to an image plane.

In the embodiment of the present invention, one of the formulas (1) to (6) may be satisfied. Alternatively, at least two of the formulas (1) to (6) in combination may be satisfied.

In the formulas, the length L uses a back focal length in air. Further, the signs (positive or negative) of the paraxial curvature radii r4, r5 are positive when an object-side surface is convex, and the signs of the paraxial curvature radii r4, r5 are negative when an image-side surface is convex.

In the imaging lens of the present invention, it is desirable that the Abbe number of the material of the first lens for d-line is greater than or equal to 40. Further, it is desirable that the Abbe number of the material of the second lens for d-line is greater than or equal to 50. Further, it is desirable that the Abbe number of the material of the third lens for d-line is less than or equal to 40. Further, it is desirable that the Abbe number of the material of the fourth lens for d-line is greater than or equal to 50.

Further, it is desirable that the imaging lens of the present invention is structured in such a manner that the full angle of view of the imaging lens is greater than 200°.

An imaging apparatus of the present invention includes an imaging lens of the present invention.

In the imaging lens of the present invention, the power, shape and the like of each lens are appropriately set in the four-lens optical system, which is composed of four lenses, and an aperture stop is arranged at an appropriate position. Therefore, it is possible to realize a wider angle of view and higher optical performance at the same time, while the imaging lens is structured at low cost and in small size.

The imaging apparatus of the present invention includes the imaging lens of the present invention. Therefore, it is possible to structure the imaging apparatus at low cost and in small size. Further, the imaging apparatus of the present invention can perform imaging with a wide angle of view, and obtain high-quality images or video images.

BRIEF DESCRIPTION OF THE DRAWINGS

FIG. 2 is a cross section of an imaging lens in Example 2 of the present invention, illustrating the structure of the imaging lens and optical paths;

FIG. 3 is a cross section of an imaging lens in Example 3 of the present invention, illustrating the structure of the imaging lens and optical paths;

FIGS. 4A through 4G are diagrams illustrating aberrations of the imaging lens in Example 1 of the present invention;

FIGS. 5A through 5G are diagrams illustrating aberrations of the imaging lens in Example 2 of the present invention;

FIGS. 6A through 6G are diagrams illustrating aberrations of the imaging lens in Example 3 of the present invention.

DESCRIPTION OF THE PREFERRED EMBODIMENTS

Figure 1:
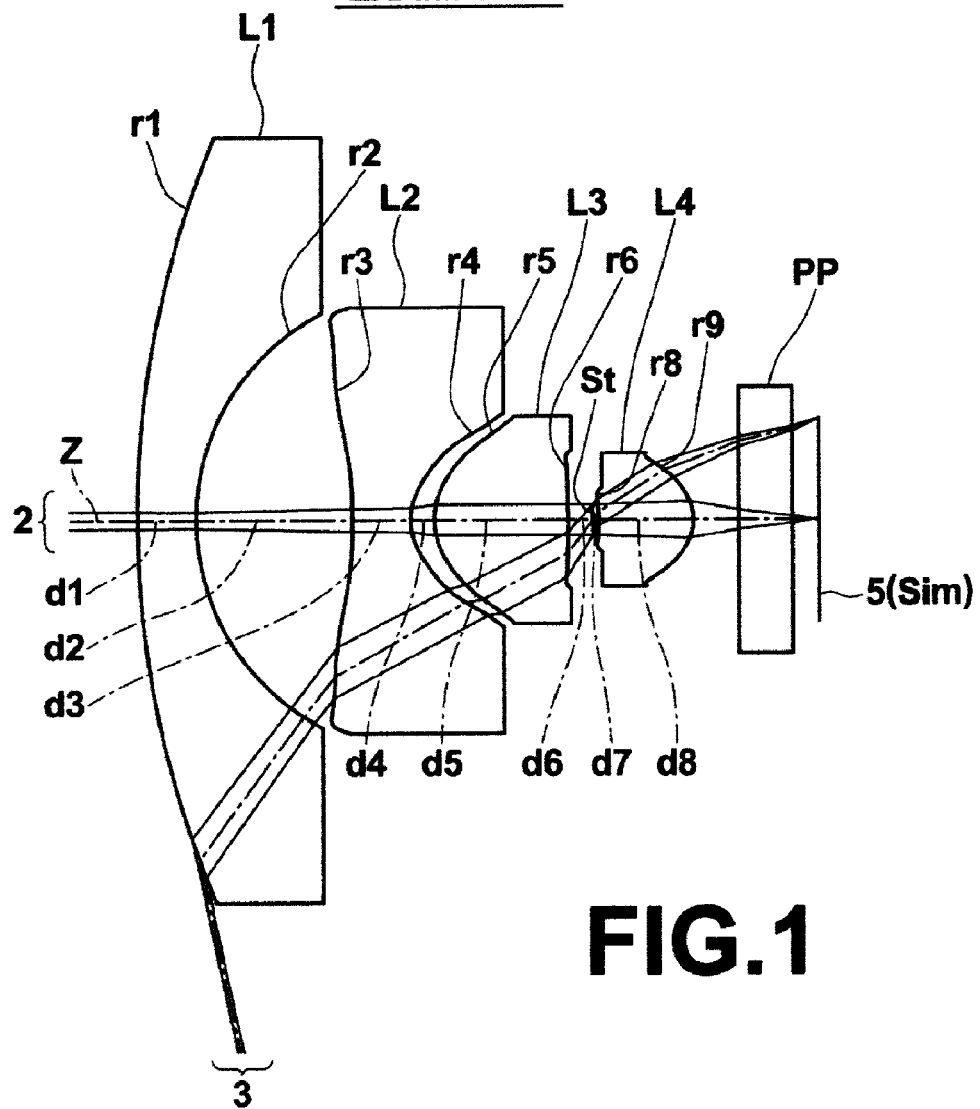
FIG. 1 is a cross section of an imaging lens in Example 1 of the present invention, illustrating the structure of the imaging lens and optical paths.

Hereinafter, embodiments of the present invention will be described in detail with reference to drawings. FIGS. 1 through 3 are cross sections of imaging lenses according to embodiments of the present invention. FIGS. 1 through 3 correspond to imaging lenses of Examples 1 through 3, respectively, which will be described later. The examples illustrated in FIGS. 1 through 3 have basically similar structure, and FIGS. 1 through 3 are illustrated in a similar manner. Therefore, an imaging lens according to an embodiment of the present invention will be described mainly with reference to FIG. 1.

The imaging lens according to the present embodiment is a lens system composed of four lenses, namely, first lens L1, second lens L2, third lens L3 and fourth lens L4, which are sequentially arranged along optical axis Z from the object side of the imaging lens. Aperture stop (stop) St is arranged between the third lens L3 and the fourth lens L4. Since the aperture stop St is arranged between the third lens L3 and the fourth lens L4, the size of the imaging lens can be reduced in the direction of the diameter of the imaging lens.

In FIG. 1, the left side is the object side of the imaging lens, and the right side is the image side of the imaging lens. Further, the aperture stop St illustrated in FIG. 1 does not necessarily represent the size nor the shape of the aperture stop St, but the position of the aperture stop St on the optical axis Z. In FIG. 1, sign ri (i=1, 2, 3, ...) represents the curvature radius of each lens surface. Sign di (i=1, 2, 3, ...) represents a distance (interval) between surfaces. Further, FIG. 1 illustrates an axial ray 2 from an object point at infinity and off-axial rays 3 at the maximum angle of view.

Further, FIG. 1 illustrates an imaging device 5, which is arranged on image plane Sim of an imaging lens 1, considering a case of applying the imaging lens 1 to an imaging apparatus. In application of the imaging lens 1 to the imaging apparatus, it is desirable to set a cover glass, a low-pass filter or an infrared-ray cut filter, or the like depending on the structure of a camera on which the lens is mounted. FIG. 1 illustrates a case in which parallel-flat-plate-shaped optical member PP, assuming such an element, is arranged between the fourth lens L4 and the imaging device 5 (image plane Sim).

The first lens L1 has negative power. The object-side surface of the first lens L1 is convex, and the image-side surface of the first lens L1 is concave. The structure of the imaging lens, in which the first lens L1 is a negative meniscus lens having a convex surface facing the object side as described above, is advantageous to increase the angle of view of the imaging lens and to correct distortion of the imaging lens. The first lens L1, which is arranged on the most object side of the imaging lens (a side closest to the object), is supposed to be exposed to wind and rain or a washing solvent or liquid. Therefore, unwanted particles, dust, water droplets, or the like may remain on the first lens L1. However, if the first lens L1 has meniscus form having a convex surface facing the object side, the unwanted particles, dust, water droplets, or the like does not tend to remain on the first lens L1, and that is advantageous to the imaging lens.

In the example illustrated in FIG. 1, the first lens L1 is a spherical lens. Alternatively, the first lens L1 may be an aspheric lens. Further, glass is more desirable than resin as the material of the first lens L1, which is arranged on the most object side of the imaging lens, as will be described later. Therefore, if the first lens L1 is a spherical lens, it is possible to produce the imaging lens at lower cost, compared with the case of adopting an aspheric lens as the first lens L1.

Both of the object-side surface and the image-side surface of each of all the second lens L2, the third lens L3, and the fourth lens L4 are aspheric. The second lens L2 has negative power in the vicinity of the optical axis of the imaging lens, and the object-side surface of the second lens L2 is convex in the vicinity of the optical axis, and the image-side surface of the second lens L2 is concave in the vicinity of the optical axis. The third lens L3 has positive power in the vicinity of the optical axis of the imaging lens, and the object-side surface of the third lens L3 is convex in the vicinity of the optical axis, and the image-side surface of the third lens L3 is concave in the vicinity of the optical axis. The fourth lens L4 has positive power in the vicinity of the optical axis of the imaging lens, and the object-side surface of the fourth lens L4 is concave in the vicinity of the optical axis, and the image-side surface of the fourth lens L4 is convex in the vicinity of the optical axis. Since both surfaces of each of the second lens L2, the third lens L3 and the fourth lens L4 are aspheric, it is possible to achieve high resolution, while reducing the length of the entire optical system in the direction of the optical axis.

In the imaging lens of the present invention, which has 4-group/4-element structure, the power and the shape of each of the first lens L1 through the fourth lens L4 are appropriately set, and the aperture stop St is arranged between the third lens L3 and the fourth lens L4, as described above. Therefore, a sufficiently wide angle of view is achieved, while the imaging lens is structured in small size and at low cost by using a small number of lenses. Further, the entire length of the imaging lens is short. Further, the imaging lens of the present invention can correct various aberrations, such as field curvature, distortion, lateral chromatic aberrations, and coma aberrations, in an excellent manner. Since the imaging lens of the present invention can achieve high resolution for a wide range of image formation area, the imaging lens can cope with an imaging device the resolution of which has increased in recent years.

It is desirable that the imaging lens of the embodiment of the present invention is further structured as described below. The imaging lens of the embodiment of the present invention may have one of the following structures. Alternatively, the imaging lens of the embodiment of the present invention may have at least two of the structures in combination.

When the focal length of the first lens L1 is f1 and the focal length of the entire system of the imaging lens is f, it is desirable that the following formula (1) is satisfied:

$$-11.0 < f1/f < -8.0 \tag{1}$$

When the value of f1/f exceeds the upper limit defined by the formula (1), the negative power of the first lens L1 becomes strong. Therefore, the absolute value of the curvature radius of the image-side surface of the first lens L1 becomes small, and the shape of the image-side surface of the first lens L1 becomes close to a hemisphere. Hence, production of the first lens L1 becomes difficult, and the cost for producing the first lens L1 increases. In contrast, when the value of f1/f becomes lower than the lower limit defined by the formula (1), the negative power of the first lens L1 becomes weak, and it becomes necessary to increase the negative power of the second lens L2 to compensate the weak power of the first lens L1. Consequently, the absolute value of the curvature radius of the second lens L2 becomes small. Hence, production of the second lens L2 becomes difficult, and the cost for producing the second lens L2 increases.

Further, it is more desirable that the following formula (1-1) is satisfied:

$$-10.5 < f1/f < -8.5 \tag{1-1}$$

When the formula (1-1) is satisfied, it is possible to increase the advantageous effect achieved by satisfying the formula (1).

Further, it is even more desirable that the following formula (1-2) is satisfied:

$$-10.0 < f1/f < -8.5 \tag{1-2}$$

When the formula (1-2) is satisfied, it is possible to further suppress the cost for producing the imaging lens, compared with the case of satisfying the formula (1-1).

When a distance between the first lens L1 and the second lens L2 on the optical axis is d2, and a length from the vertex of the object-side surface of the first lens L1 to an image plane is L, it is desirable that the following formula (2) is satisfied:

$$0.16 < d2/L < 0.30 \tag{2}$$

Here, the length L uses a back focal length in air.

When the value of d2/L exceeds the upper limit defined by the formula (2), the effective radius of the image-side surface of the first lens L1 increases, and becomes close to a curvature radius. Therefore, the process for producing the first lens L1 becomes difficult, and the cost for producing the first lens L1 increases. Further, the length of the entire lens system in the direction of the optical axis becomes long. In contrast, when the value of d2/L is lower than the lower limit defined by the formula (2), if an appropriate power is tried to be ensured in the first lens L1, the image-side surface of the first lens L1 and the object-side surface of the second lens L2 interfere with each other. Hence, it becomes impossible to ensure a necessary effective radius, and it becomes difficult to realize an optical system satisfying the object of the present invention.

Further, it is more desirable that the following formula (2-1) is satisfied:

$$0.17 < d2/L < 0.25 \tag{2-1}$$

When the formula (2-1) is satisfied, it is possible to increase the advantageous effect achieved by satisfying the formula (2).

When a distance between the second lens L2 and the third lens L3 on the optical axis is d4 and a length from the vertex of the object-side surface of the first lens L1 to an image plane is L, it is desirable that the following formula (3) is satisfied:

$$0.02 < d4/L < 0.05 \tag{3}$$

Here, the length L uses a back focal length in air.

When the value of d4/L exceeds the upper limit defined by the formula (3), it becomes difficult to correct distortion in an excellent manner while keeping the lateral chromatic aberrations in an excellent manner. Further, the length of the entire lens system becomes long. The image-side surface of the second lens L2 and object-side surface of the third lens L3 should not be in contact with each other within effective diameter. However, when the value of d4/L becomes lower than the lower limit defined by the formula (3), the risk of contact between the two surfaces increases.

Further, it is more desirable that the following formula (3-1) is satisfied:

$$0.03 < d4/L < 0.045 \quad (3\text{-}1).$$

When the formula (3-1) is satisfied, it is possible to increase the advantageous effect achieved by satisfying the formula (3).

When the focal length of the second lens L2 is f2 and the focal length of the third lens L3 is f3, it is desirable that the following formula (4) is satisfied:

$$-1.2 < f2/f3 < -0.5 \quad (4).$$

When the value of f2/f3 exceeds the upper limit defined by the formula (4), distortion and lateral chromatic aberrations increase at middle angles of view. In contrast, when the value of f2/f3 is lower than the lower limit defined by the formula (4), correction of coma aberrations becomes difficult. Further, it becomes difficult to suppress longitudinal chromatic aberrations to a practically applicable level.

Further, it is more desirable that the following formula (4-1) is satisfied:

$$-1.1 < f2/f3 < -0.6 \quad (4\text{-}1).$$

When the formula (4-1) is satisfied, it is possible to increase the advantageous effect achieved by satisfying the formula (4).

Further, it is even more desirable that the following formula (4-2) is satisfied:

$$-1.0 < f2/f3 < -0.7 \quad (4\text{-}2).$$

When the formula (4-2) is satisfied, it is possible to further increase the advantageous effect achieved by satisfying the formula (4-1).

When the combined focal length of the third lens L3 and the fourth lens L4 is f34 and a length from the vertex of the object-side surface of the first lens L1 to an image plane is L, it is desirable that the following formula (5) is satisfied:

$$2.0 < L/f34 < 6.0 \quad (5).$$

Here, the length L uses a back focal length in air.

When the value of L/f34 exceeds the upper limit defined by the formula (5), the power of the third lens L3 becomes weak, and lateral chromatic aberrations are insufficiently corrected, or the power of the fourth lens L4 becomes weak, and field curvature and coma aberrations are insufficiently corrected. When the value of L/f34 exceeds the upper limit defined by the formula (5), and the power of the third lens L3 and the power of the fourth lens L4 are strong, the third lens L3 and the fourth lens L4 are too close to each other, and it becomes difficult to arrange the third lens L3 and the fourth lens L4. Hence, it becomes difficult to produce the imaging lens at low cost. In contrast, when the value of L/f34 is lower than the lower limit defined by the formula (5), the power of the third lens L3 becomes strong, and longitudinal chromatic aberrations become excessively large, or the power of the fourth lens L4 becomes strong, and it becomes difficult to correct field curvature and coma aberrations. When the value of L/f34 is lower than the lower limit defined by the formula (5), and neither the power of the third lens L3 nor the power of the fourth lens L4 is strong, a distance between the third lens L3 and the fourth lens L4 becomes long, and the size of the lens system increases.

Further, it is more desirable that the following formula (5-1) is satisfied:

$$2.2 < L/f34 < 5.0 \quad (5\text{-}1).$$

When the formula (5-1) is satisfied, it is possible to increase the advantageous effect achieved by satisfying the formula (5).

Further, it is even more desirable that the following formula (5-2) is satisfied:

$$2.3 < L/f34 < 4.8 \quad (5\text{-}2).$$

When the formula (5-2) is satisfied, it is possible to further increase the advantageous effect achieved by satisfying the formula (5-1).

When the paraxial curvature radius of the image-side surface of the second lens L2 is r4 and the paraxial curvature radius of the object-side surface of the third lens L3 is r5, it is desirable that the following formula (6) is satisfied:

$$1.0 < r5/r4 < 2.0 \quad (6).$$

When the value of r5/r4 exceeds the upper limit defined by the formula (6), distortion and lateral chromatic aberrations increase at middle angles of view. In contrast, when the value of r5/r4 is lower than the lower limit defined by the formula (6), it becomes difficult to correct coma aberrations in an excellent manner.

Further, it is more desirable that the following formula (6-1) is satisfied:

$$1.1 < r5/r4 < 1.8 \quad (6\text{-}1).$$

When the formula (6-1) is satisfied, it becomes possible to more easily correct coma aberrations in an excellent manner.

It is desirable that the Abbe number of the material of the first lens L1 for d-line is greater than or equal to 40. When such material is selected, it becomes possible to easily correct lateral chromatic aberrations in an excellent manner. Further, it is desirable that the Abbe number of the material of the second lens L2 for d-line is greater than or equal to 50. When such material is selected, it becomes possible to easily correct lateral chromatic aberrations in an excellent manner. Further, it is desirable that the Abbe number of the material of the third lens L3 for d-line is less than or equal to 40. When such material is selected, it becomes possible to easily correct lateral chromatic aberrations in an excellent manner. Further, it is more desirable that the Abbe number of the material of the third lens L3 for d-line is less than or equal to 29. When such material is selected, it becomes possible to easily correct lateral chromatic aberrations in a more excellent manner. Further, it is desirable that the Abbe number of the material of the fourth lens L4 for d-line is greater than or equal to 50. When such material is selected, it becomes possible to easily correct lateral chromatic aberrations in an excellent manner. Therefore, it is possible to increase resolution by correcting lateral chromatic aberrations in an excellent manner. Further, the imaging lens can cope with an imaging device, the resolution of which increased in recent years.

Further, it is desirable that the full angle view of the imaging lens of the present invention is greater than 200°. The full angle of view is twice the angle formed by the principal ray of the off-axial rays 3 at the maximum angle of view and the optical axis Z. When the imaging lens is a wide angle lens system having a full angle of view exceeding 200°, it is possible to satisfy the need for wider angle lenses in recent years.

Further, as in the example illustrated in FIG. 1, it is desirable that each of all the first lens L1 through the fourth lens L4 in the imaging lens of the present invention is a single lens, which is not a cemented lens. When an imaging lens is supposed to be used in tough conditions, for example, in an in-vehicle camera or a monitor camera, it is desirable that no cemented lens is included in the imaging lens. When no cemented lens is included in the imaging lens, it is possible to produce the imaging lens at low cost.

When the imaging lens of the present invention is used in tough conditions, for example, in an in-vehicle camera or a monitor camera, the material of the first lens L1, which is arranged on the most object side, needs to be resistant to wind and rain, which damages the surface of the lens. Further, the material of the first lens L1 needs to be resistant to a change in temperature by direct sunlight. Further, the material of the first lens L1 needs to be resistant to chemicals, such as oils and fats, and detergents. In other words, the material of the first lens L1 needs to be highly water-resistant, weather-resistant, acid-resistant, chemical-resistant, and the like. For example, it is desirable to use a material having water resistance of 1 measured by the powder method regulated by Japan Optical Glass Industry Standard (JOGIS). Further, in some cases, the material of the first lens L1 needs to be hard and not easily breakable nor crackable. If the material of the first lens is glass, it is possible to satisfy such need. Alternatively, transparent ceramic may be used as the material of the first lens L1.

Further, a protection means may be provided on the object-side surface of the first lens L1 to improve the strength, scratch resistance, and chemical resistance of the surface. In that case, the material of the first lens L1 may be plastic. The protection means may be a hard coating or a water-repellent coating.

It is desirable that the material of the second lens L2, the third lens L3 and the fourth lens L4 is plastic. When the material is plastic, it is possible to accurately form the aspheric shape of each of the lenses. Further, it is possible to reduce the weight of the imaging lens and the cost for production.

Some plastic materials have high water absorption characteristics, and the refractive indices of such plastic materials and the sizes of shaped plastics may change by absorption or desorption of water, or the like. Consequently, the optical performance may be affected. If plastic materials that have extremely low water absorption characteristics are used, it is possible to minimize the deterioration of the performance by absorption of water. Specifically, polyolefin-based plastic may be used as the material of the second lens L2 and the fourth lens L4. Further, polycarbonate-based plastic or PET-based (polyethylene-terephthalate-based) plastic may be used as the material of the third lens L3.

When plastic is used as the material of at least one of the second lens L2, the third lens L3 and the fourth lens L4, so-called nano-composite material, in which particles smaller than the wavelength of light are mixed into plastic, may be used.

In the imaging lens of the present invention, an anti-reflection coating may be applied to each lens to reduce ghost light or the like. In that case, with respect to the image-side surface of the first lens L1, the image-side surface of the second lens L2, and the object-side surface of the third lens L3 of the imaging lens illustrated in FIG. 1, an angle formed by a tangent line at a point in a peripheral area of each of the surfaces and the optical axis is small. Therefore, the thickness of the anti-reflection coating in the peripheral area is thinner than that of the anti-reflection coating in the central area of the lens. Therefore, it is possible to reduce the reflectance of the entire effective diameter in average by applying, to at least one of the aforementioned three surfaces, an anti-reflection coating the reflectance of which in the vicinity of the center is lowest when the wavelength of light is greater than or equal to 600 nm and less than or equal to 900 nm. Accordingly, ghost light can be reduced.

If the reflectance in the vicinity of the center of the lens is lowest when the wavelength of light is less than 600 nm, the wavelength of light that reflects at the lowest reflectance in the peripheral area of the lens becomes too short, and the reflectance for the long wavelength side becomes high. Therefore, reddish ghost tends to be generated. In contrast, if the reflectance in the vicinity of the center of the lens is lowest when the wavelength of light is longer than 900 nm, the wavelength of light that reflects at the lowest reflectance in the central area of the lens becomes too long, and the reflectance for the short wavelength side becomes high. Therefore, the color tone (hue) of an image becomes quite reddish, and bluish ghost tends to be generated.

In the imaging lens of the present invention, a ray of light passing the outside of the effective diameter between lenses may become stray light, and reach the image plane. Further, the stray light may become ghost. Therefore, it is desirable that a light cutting means for cutting the stray light is provided, if necessary. The light cutting means may be provided, for example, by applying an opaque paint to a portion of the image-side surface of the lens, the portion on the outside of the effective diameter. Alternatively, an opaque plate member may be provided. The light cutting means may be provided by setting an opaque plate member in the optical path of rays that will become stray light.

Further, a filter that cuts light in the range of ultraviolet to blue or an IR (InfraRed) cut filter, which cuts infrared light, may be inserted between the lens system and the imaging device 5, depending on the use of the imaging lens. Alternatively, a coating (coat) that has similar properties to the aforementioned filters may be applied to the lens surface.

FIG. 1 illustrates a case in which the optical member PP, assuming various filters, is arranged between the lens system and the imaging device 5. Instead, the various filters may be arranged between the lenses. Alternatively, a coating that acts in a similar manner to the various filters may be applied to a surface of at least a lens in the imaging lens.

Next, examples of numerical values of the imaging lens of the present invention will be described. FIGS. 1 through 3 are cross-sections of the imaging lenses in Examples 1 through 3.

Table 1 shows lens data about the imaging lens of Example 1, and Table 2 shows aspheric data about the imaging lens of Example 1. Similarly, Tables 3 through 6 show lens data and aspheric data about imaging lenses of Examples 2 and 3. In the following descriptions, the meanings of signs in the tables will be explained by using Example 1. The meanings of the signs are basically the same for Examples 2 and 3.

In the lens data of Table 1, column si shows the surface number of the i-th surface (i=1, 2, 3, . . . ). The most object-side surface of elements constituting the lens system is the first surface, and surface numbers sequentially increase toward the image side. Further, column ri shows the curvature radius of the i-th surface, and column di shows a distance between the i-th surface and (i+1) th surface on the optical axis Z. The sign (positive/negative) of the curvature radius is positive when the object-side surface is convex, and negative when the image-side surface is convex. In each of the examples, ri and di (i=1, 2, 3, . . . ) in the table of lens data correspond to signs ri and di in the cross-section of the lens.

Figure 8A:
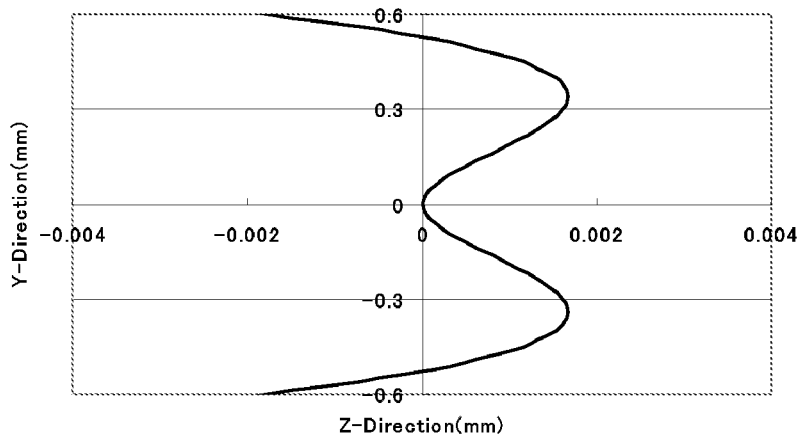
FIGS. 8A, 8B, and 8C are enlarged diagrams of the shape of r3 in the vicinity of the optical axis for the lenses of FIGS. 1-3.
Figure 8B:
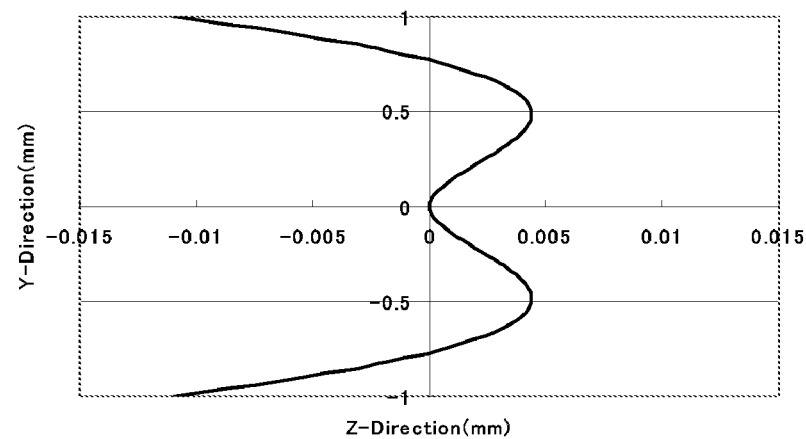
Figure 8C:
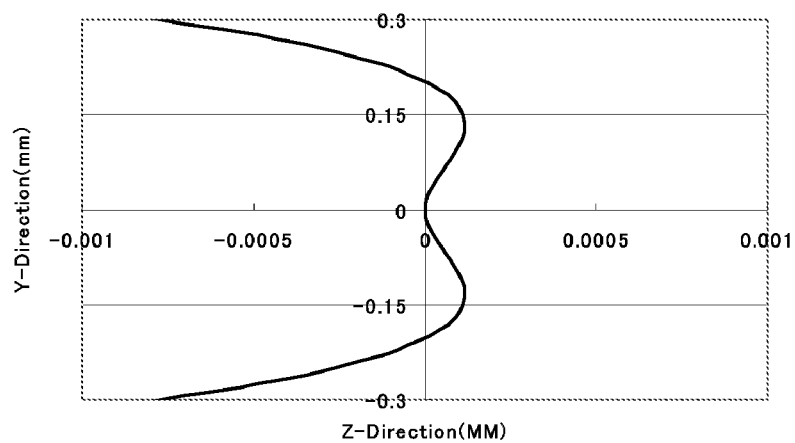

FIGS. 8A, 8B, and 8C provide enlarged diagrams of the shape of r3 in the vicinity of the optical axis. In each figure, the left side is the object side of the imaging lens and the right side is the image side of the imaging lens. FIG. 8A corresponds to r3 of FIG. 1; FIG. 8B corresponds to r3 of FIG. 2; and FIG. 8C corresponds to r3 of FIG. 3. As illustrated, all three cases are convex toward the object side in the vicinity of the optical axis.

In the lens data of Table 1, column Nej shows the refractive index of the j-th lens (j=1, 2, 3, . . . ) for e-line (wavelength is 546.07 nm). The most-object side lens is the first lens, and the number j sequentially increases toward the image side. Further, the column vdj shows the Abbe number of the j-th optical element for d-line (wavelength is 587.6 nm). The lens data includes aperture stop (stop) St. In the column ri of curvature radii, "∞ (stop)" is written in the box corresponding to the aperture stop St.

In FIGS. 1 through 3, optical member PP, which is arranged between the fourth lens L4 and image plane Sim, assumes a cover glass, a filter or the like. In all of Examples 1 through 3, the material of the optical member PP is glass having a refractive index of 1.52, and the thickness of the optical member PP is 1.0 mm.

In the lens data of Table 1, mark "*" is attached to the surface number of an aspheric surface. Further, Table 1 shows, as the curvature radius of the aspheric surface, the numerical value of the curvature radius in the vicinity of the optical axis (paraxial curvature radius). The aspheric data in Table 2 shows the surface numbers of aspheric surfaces and aspheric coefficients related to the aspheric surfaces. In the numerical values of aspheric data in Table 2, "E-n" (n: integer) means "×10$^{-n}$", and "E+n" means "×10$^{n}$". Further, the aspheric coefficients are coefficients K, Bm(m=3, 4, 5, . . . 20) in the following aspheric equation:

$$Zd = C \cdot h^2 / \{1 + (1 - K \cdot C^2 \cdot h^2)^{1/2}\} + \Sigma Bm \cdot h^m, \text{ where}$$

Zd: depth of aspheric surface (the length of a perpendicular from a point on the aspheric surface at height h to a flat plane that contacts with the vertex of the aspheric surface and is perpendicular to the optical axis), h: height (the length from the optical axis to the lens surface), C: the inverse number of the paraxial curvature radius, and K, Bm: aspheric coefficients (m=3, 4, 5, . . . 20).

TABLE 1

Example 1 Lens Data

| si | ri | di | Nej | vdj |
|---|---|---|---|---|
| 1 | 18.5000 | 1.1000 | 1.77620 | 49.6 |
| 2 | 4.4000 | 2.9191 | | |
| *3 | 21.2547 | 1.1000 | 1.53340 | 55.4 |
| *4 | 1.1861 | 0.4439 | | |
| *5 | 1.6015 | 2.5000 | 1.61965 | 25.5 |
| *6 | 309.1497 | 0.3261 | | |
| 7 | ∞(STOP) | 0.2529 | | |
| *8 | −2.8164 | 1.7723 | 1.53340 | 55.4 |
| *9 | −0.7874 | | | |

TABLE 2

Example 1 Aspheric Data

| si | 3 | 4 | 5 | 6 | 8 | 9 |
|---|---|---|---|---|---|---|
| K | 0 | 0 | 0 | 0 | 0 | 0 |
| B3 | −1.07085E−01 | 1.09695E−01 | 1.42222E−01 | 1.90687E−02 | 6.44924E−01 | 3.82425E−01 |
| B4 | 3.23383E−02 | −7.71575E−02 | −2.63693E−02 | −8.52345E−02 | −2.21922E+00 | −1.16610E+00 |
| B5 | 3.63280E−03 | −7.30225E−02 | −6.41480E−02 | −1.41954E−02 | −7.76311E+00 | 1.48922E+00 |
| B6 | −8.53521E−04 | 1.58088E−02 | −7.75601E−03 | 1.03763E−01 | 4.33865E+01 | −5.03427E−01 |
| B7 | −3.83752E−04 | 1.41655E−02 | 2.56094E−02 | 9.05899E−02 | −4.65732E+00 | −4.80903E−01 |
| B8 | −2.12706E−05 | 5.97121E−03 | 1.54811E−02 | −7.20423E−02 | −1.18775E+02 | −2.46806E−02 |
| B9 | 1.08108E−05 | 1.76421E−03 | −1.01407E−02 | −2.31246E−01 | −2.16444E+02 | 2.15078E−01 |
| B10 | 6.02633E−06 | 3.47288E−04 | −1.05785E−02 | −1.46871E−01 | 2.92903E+02 | 1.96269E−01 |
| B11 | 1.48539E−06 | −9.70726E−06 | 6.98253E−03 | 3.40228E−01 | 1.23849E+03 | 4.90114E−02 |
| B12 | −5.80385E−07 | 1.67504E−04 | 3.50574E−03 | 3.62878E−01 | −1.23741E+02 | −3.86469E−02 |
| B13 | −1.11525E−07 | −1.17825E−04 | 3.39266E−05 | −4.26406E−01 | −1.44797E+03 | −7.87345E−02 |
| B14 | −3.11264E−08 | −1.22839E−04 | −9.76987E−04 | −1.58022E−01 | −4.26434E+03 | −7.12486E−02 |
| B15 | −5.36088E−10 | −9.95548E−05 | −7.24161E−04 | 3.71372E−01 | −2.44421E+03 | −3.73169E−02 |
| B16 | 6.19375E−09 | −5.95826E−05 | −1.72384E−04 | −1.72999E−01 | 3.97231E+03 | −3.19576E−03 |
| B17 | 2.56661E−09 | −5.88284E−06 | 7.76195E−05 | −1.15243E−01 | 4.90443E+04 | 2.50949E−02 |
| B18 | −5.68227E−11 | 1.59735E−05 | 1.22487E−04 | 7.92883E−02 | −1.02677E+04 | 5.25043E−02 |
| B19 | −5.37297E−10 | 1.75314E−05 | 5.74794E−05 | 7.45992E−02 | −1.61194E+05 | 2.09098E−02 |
| B20 | 8.84899E−11 | −5.70999E−06 | −3.76576E−05 | −4.45220E−02 | 1.36354E+05 | −3.07445E−02 |

TABLE 3

Example 2 Lens Data

| si | ri | di | Nej | vdj |
|---|---|---|---|---|
| 1 | 16.3871 | 1.1000 | 1.77620 | 49.6 |
| 2 | 4.2987 | 2.0000 | | |
| *3 | 15.6586 | 1.1000 | 1.53340 | 55.4 |
| *4 | 1.1349 | 0.4439 | | |
| *5 | 1.7264 | 2.3112 | 1.61965 | 25.5 |
| *6 | 46.7464 | 0.2122 | | |
| 7 | ∞(STOP) | 0.2529 | | |
| *8 | −3.2626 | 1.6875 | 1.53340 | 55.4 |
| *9 | −0.7205 | | | |

TABLE 4

Example 2 Aspheric Data

| si | 3 | 4 | 5 | 6 | 8 | 9 |
|---|---|---|---|---|---|---|
| K | 0 | 0 | 0 | 0 | 0 | 0 |
| B3 | −1.09473E−01 | 1.03196E−01 | 1.86366E−01 | 2.97260E−02 | 5.32974E−01 | 4.17383E−01 |
| B4 | 3.23296E−02 | −7.46155E−02 | −3.54391E−02 | −7.40899E−02 | −2.04000E+00 | −1.19777E+00 |
| B5 | 3.59101E−03 | −7.35290E−02 | −6.22519E−02 | −1.21869E−02 | −7.53414E+00 | 1.54683E+00 |
| B6 | −8.73955E−04 | 1.65616E−02 | −6.55950E−03 | 1.01768E−01 | 4.16763E+01 | −5.04747E−01 |
| B7 | −3.87269E−04 | 1.46194E−02 | 2.57143E−02 | 9.09993E−02 | −7.12646E+00 | −4.91451E−01 |
| B8 | −2.05997E−05 | 6.15196E−03 | 1.57593E−02 | −7.52594E−02 | −1.19580E+02 | −2.81003E−02 |
| B9 | 1.08376E−05 | 1.93076E−03 | −1.00002E−02 | −2.38486E−01 | −1.52340E+02 | 2.09002E−01 |
| B10 | 6.17565E−06 | 1.79251E−04 | −1.05116E−02 | −1.36284E−01 | 1.86795E+02 | 1.82649E−01 |
| B11 | 1.48539E−06 | −9.70726E−06 | 6.98253E−03 | 3.40228E−01 | 1.23849E+03 | 4.90114E−02 |
| B12 | −5.80385E−07 | 1.67504E−04 | 3.50574E−03 | 3.62878E−01 | −1.23741E+02 | −3.86469E−02 |
| B13 | −1.11525E−07 | −1.17825E−04 | 3.39266E−05 | −4.26406E−01 | −1.44797E+03 | −7.87345E−02 |
| B14 | −3.11264E−08 | −1.22839E−04 | −9.76987E−04 | −1.58022E−01 | −4.26434E+03 | −7.12486E−02 |
| B15 | −5.36088E−10 | −9.95548E−05 | −7.24161E−04 | 3.71372E−01 | −2.44421E+03 | −3.73169E−02 |
| B16 | 6.19375E−09 | −5.95826E−05 | −1.72387E−04 | −1.72999E−01 | 3.97231E+03 | −3.19576E−03 |
| B17 | 2.56661E−09 | −5.88284E−06 | 7.76195E−05 | −1.15243E−01 | 4.90443E+04 | 2.50949E−02 |
| B18 | −5.68227E−11 | 1.59735E−05 | 1.22487E−04 | 7.92883E−02 | −1.02677E+04 | 5.25043E−02 |
| B19 | −5.37297E−10 | 1.75314E−05 | 5.74794E−05 | 7.45992E−02 | −1.61194E+05 | 2.09098E−02 |
| B20 | 8.84899E−11 | −5.70999E−06 | −3.76576E−05 | −4.45220E−02 | 1.36354E+05 | −3.07445E−02 |

TABLE 5

Example 3 Lens Data

| si | ri | di | Nej | νdj |
|---|---|---|---|---|
| 1 | 11.4714 | 1.1000 | 1.77620 | 49.6 |
| 2 | 3.8886 | 2.4375 | | |
| *3 | 50.0248 | 1.1000 | 1.53340 | 55.4 |
| *4 | 1.6374 | 0.4439 | | |
| *5 | 2.3888 | 2.7740 | 1.61965 | 25.5 |
| *6 | 11.1946 | 0.0065 | | |
| 7 | ∞(STOP) | 0.2529 | | |
| *8 | −5.0476 | 1.6916 | 1.53340 | 55.4 |
| *9 | −0.7692 | | | |

TABLE 6

Example 3 Aspheric Data

| si | 3 | 4 | 5 | 6 | 8 | 9 |
|---|---|---|---|---|---|---|
| K | 0 | 0 | 0 | 0 | 0 | 0 |
| B3 | −1.05108E−01 | 1.55634E−01 | 2.42964E−01 | 6.44451E−02 | 3.26556E−01 | 3.46881E−01 |
| B4 | 3.21826E−02 | −5.83567E−02 | −6.70300E−02 | −7.89608E−02 | −1.21417E+00 | −1.07697E+00 |
| B5 | 2.91906E−03 | −9.38233E−02 | −5.99298E−02 | 6.95324E−02 | −7.69697E+00 | 1.44142E+00 |
| B6 | −7.73129E−04 | 1.74574E−02 | −1.21169E−02 | 1.87876E−01 | 3.85675E+01 | −5.17570E−01 |
| B7 | −3.69263E−04 | 1.34274E−02 | 2.84742E−02 | −6.01199E−01 | −9.12000E+00 | −4.78376E−01 |
| B8 | −2.09081E−05 | 5.61684E−03 | 1.90741E−02 | −2.43553E−01 | −1.05489E+02 | −1.78601E−02 |
| B9 | 9.96154E−06 | 1.56344E−03 | −9.99014E−03 | 3.14611E−01 | −1.38947E+02 | 2.09564E−01 |
| B10 | 6.25984E−06 | 8.06347E−04 | −1.11776E−02 | 5.76104E−01 | 1.47154E+02 | 1.82541E−01 |
| B11 | 1.48539E−06 | −9.70726E−06 | 6.98253E−03 | 3.40228E−01 | 1.23849E+03 | 4.90114E−02 |
| B12 | −5.80385E−07 | 1.67504E−04 | 3.50574E−03 | 3.62878E−01 | −1.23741E+02 | −3.86469E−02 |
| B13 | −1.11525E−07 | −1.17825E−04 | 3.39266E−05 | −4.26406E−01 | −1.44797E+03 | −7.87345E−02 |
| B14 | −3.11264E−08 | −1.22839E−04 | −9.76987E−04 | −1.58022E−01 | −4.26434E+03 | −7.12486E−02 |
| B15 | −5.36088E−10 | −9.95548E−05 | −7.24161E−04 | 3.71372E−01 | −2.44421E+03 | −3.73169E−02 |
| B16 | 6.19375E−09 | −5.95826E−05 | −1.72384E−04 | −1.72999E−01 | 3.97231E+03 | −3.19576E−03 |
| B17 | 2.56661E−09 | −5.88284E−06 | 7.76195E−05 | −1.15243E−01 | 4.90443E+04 | 2.50949E−02 |
| B18 | −5.68227E−11 | 1.59735E−05 | 1.22487E−04 | 7.92883E−02 | −1.02677E+04 | 5.25043E−02 |
| B19 | −5.37297E−10 | 1.75314E−05 | 5.74794E−05 | 7.45992E−02 | −1.61194E+05 | 2.09098E−02 |
| B20 | 8.84899E−11 | −5.70999E−06 | −3.76576E−05 | −4.45220E−02 | 1.36354E+05 | −3.07445E−02 |

In Examples 1 through 3, the material of the first lens L1 is optical glass, and both surfaces (the object-side surface and the image side surface) of the first lens L1 are spherical. Therefore, the first lens L1 has excellent weather resistant characteristics, and is not easily scratchable by earth or sand or the like. Further, it is possible to produce the first lens L1 relatively at low cost. In Examples 1 through 3, the material of the second lens L2 and the fourth lens L4 are polyolefin-based plastic, and the material of the third lens L3 is polycarbonate-based plastic. The plastics that have low water absorption characteristics are selected so as to suppress fluctuation in the performance of the lenses by absorption of water as much as possible.

Table 7 shows values corresponding to various data about the imaging lenses of Examples 1 through 3 and formulas (1) through (6). In Examples 1 through 3, e-line is reference wavelength, and Table 7 shows values at the reference wavelength.

In Table 7, f is the focal length of the entire system of the imaging lens, and Bf is the length from the image-side surface of the most-image-side lens to image plane Sim on the optical axis (corresponding to back focus). Further, L is the length from the object-side surface of the first lens L1 to the image plane Sim on the optical axis. Further, Fno. is F-number, and 2ω is the full angle of view. The value of Bf is a length in air. Specifically, the thickness of the optical member PP is converted in air to calculate the back focus Bf. Similarly, the back focus portion in the length L is a length in air. In all of Examples 1 through 3, the maximum image height is 1.90 mm. As Table 7 shows, all of Examples 1 through 3 satisfy formulas (1) through (6).

TABLE 7

|  | EXAMPLE 1 | EXAMPLE 2 | EXAMPLE 3 |
| --- | --- | --- | --- |
| f | 0.848 | 0.785 | 0.835 |
| Bf | 1.999 | 1.819 | 1.965 |
| L | 12.413 | 10.927 | 11.772 |
| Fno. | 2.9 | 2.9 | 2.9 |
| 2ω | 204.4° | 206.2° | 201.8° |
| f1/f | −9.085 | −9.960 | −9.696 |
| d2/L | 0.235 | 0.183 | 0.207 |
| d4/L | 0.036 | 0.041 | 0.038 |
| f2/f3 | −0.927 | −0.830 | −0.731 |
| L/f34 | 2.456 | 3.226 | 4.540 |
| r5/r4 | 1.350 | 1.521 | 1.459 |

In Tables 1 through 7, values are rounded to predetermined digits. The unit of the numerical values is "°" for angles, and "mm" for lengths. However, these units are only examples. Since an optical system can achieve similar optical performance when the optical system is proportionally enlarged or reduced, other appropriate units may be used.

FIGS. 4A through 4G are diagrams illustrating aberrations of the imaging lens in Example 1. FIGS. 4A through 4D illustrate spherical aberrations, astigmatism, distortion (distortion aberrations), and lateral chromatic aberrations (chromatic aberrations of magnification), respectively. FIGS. 4E through 4G illustrate transverse aberrations in tangential direction at respective half angles of view. FIGS. 4A through 4G illustrate aberrations when e-line is reference wavelength. Further, in FIGS. 4A and 4D, which illustrate spherical aberrations and lateral chromatic aberrations respectively, aberrations for g-line (wavelength is 435.84 nm) and aberrations for C-line (wavelength is 656.27 nm) are also illustrated. In the diagram illustrating the spherical aberrations, Fno. represents F-number, and in the other diagrams, ω represents half angles of view.

Similarly, FIGS. 5A through 5G, and 6A through 6G illustrate spherical aberrations, astigmatism, distortion (distortion aberrations), lateral chromatic aberrations, and transverse aberrations of imaging lenses in Examples 2 and 3, respectively.

In the diagrams illustrating distortion aberrations, shift amounts from ideal image heights "2×f×tan (φ/2)" are illustrated by using focal length f of the entire system of the imaging lens and half angle φ of view (variable, 0≦φ≦ω). Therefore, the values are minus in the peripheral area. However, when the distortions of the imaging lenses in Examples 1 through 3 are calculated with respect to image heights based on equidistant projection, the distortions are large plus values. This is because the imaging lenses of Examples 1 through 3 are designed so that images of the peripheral areas are large, compared with lenses that are designed to suppress distortion at image heights based on equidistant projection.

As the above data show, each of the imaging lenses of Examples 1 through 3 is composed of a small number of lenses, i.e., four lenses, thereby reducing the sizes of the imaging lenses and the cost for producing the imaging lenses. Further, the imaging lenses of Examples 1 through 3 have extremely wide angles of view of around 205° and small F-numbers of 2.9. Further, each aberration is corrected in an excellent manner, and the imaging lenses have high resolution and excellent optical performance. These imaging lenses are appropriate for use in monitor cameras and in-vehicle cameras for imaging the front side, left and/or right side, rear side, or the like of a car.

Figure 7:
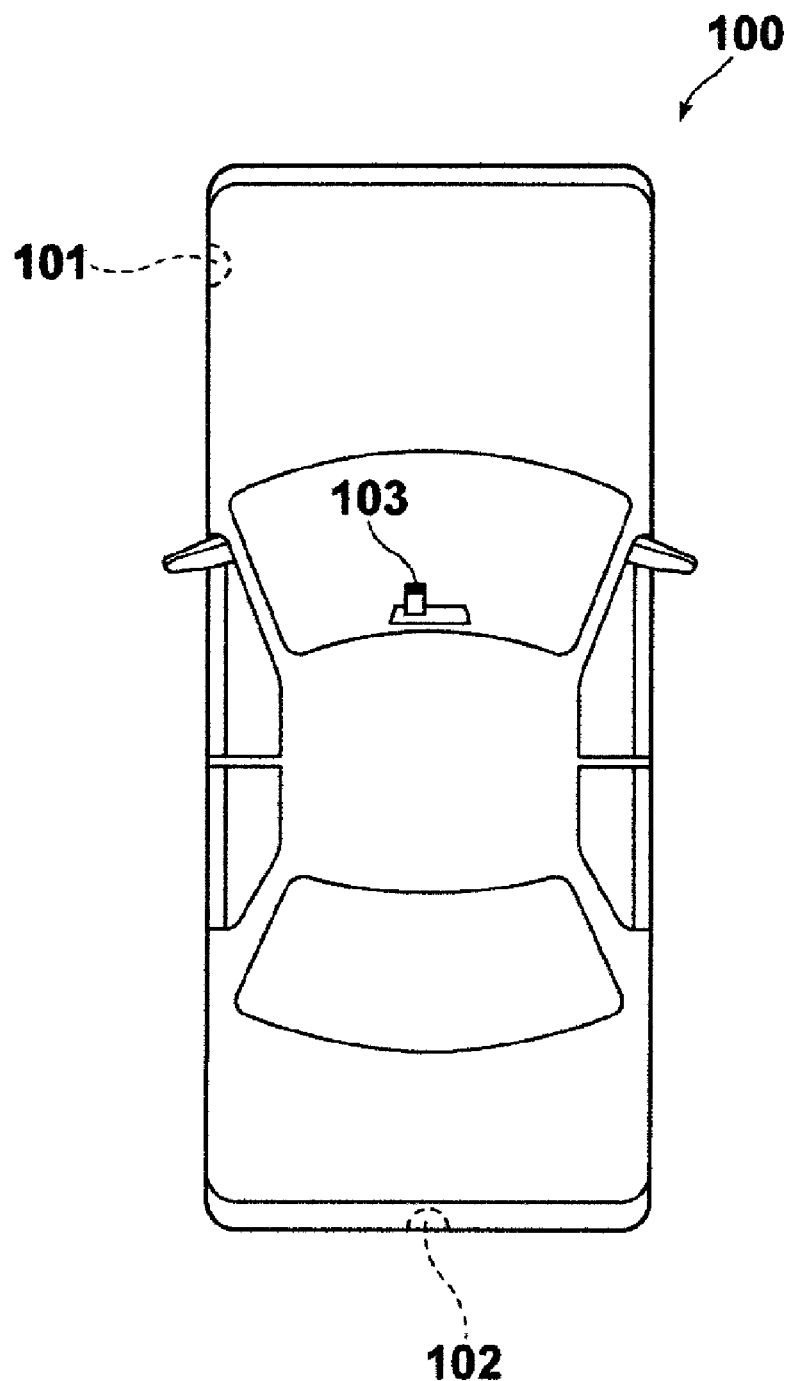
FIG. 7 is a diagram for explaining the arrangement of an imaging apparatus for in-vehicle use according to an embodiment of the present invention.

FIG. 7 illustrates a manner of mounting an imaging apparatus including the imaging lens according to the embodiment of the present invention on a car 100. In FIG. 7, an exterior camera 101, an exterior camera 102, and an interior camera 103 are provided in the car 100. The exterior camera 101 images the driver's blind spot on a side of the car 100, which is the side of the seat next to the driver. The exterior camera 102 images the driver's blind spot on the rear side of the car 100. The interior camera 103 is attached to the back side of a rearview mirror, and images the same range as the driver's visual field. The exterior camera 101, the exterior camera 102, and the interior camera 103 are imaging apparatuses according to the embodiment of the present invention. Each of the exterior camera 101, the exterior camera 102, and the interior camera 103 includes an imaging lens according to an embodiment of the present invention and an imaging device for converting an optical image formed by the imaging lens into electric signals.

The imaging lenses according to the embodiments of the present invention have the aforementioned advantages. Therefore, the exterior cameras 101 and 102, and the interior camera 103 can be structured in small size and produced at low cost. Further, the exterior cameras 101 and 102, and the interior camera 103 have wide angles of view, and can obtain high-resolution images (or video images) in an excellent manner.

The present invention has been described by using embodiments and examples. However, the present invention is not limited to the aforementioned embodiments nor examples, and various modifications are possible. For example, the values of the curvature radius, a distance between surfaces, refractive index, Abbe number, and aspheric coefficients of each lens element are not limited to the values in the aforementioned examples of numerical values, but may be other values. Further, the material of the lenses is not limited to the materials used in the examples of numerical values, but may be other materials.

In the embodiment of the imaging apparatus, a case in which the imaging lens is applied to an in-vehicle camera was described. However, the use of the imaging apparatus of the present invention is not limited to the in-vehicle camera. For example, the imaging apparatus of the present invention may be applied to a camera for a mobile terminal, a monitor camera, and the like.

What is claimed is:

1. An imaging lens comprising only four lenses:
    a first lens;
    a second lens;
    a third lens;
    an aperture stop; and
    a fourth lens, which are sequentially arranged from the object side of the imaging lens,
    wherein the first lens has negative power, and an object-side surface of the first lens is convex and an image-side surface of the first lens is concave, and
    wherein an object-side surface and an image-side surface of the second lens are aspheric, and the second lens has negative power in the vicinity of the optical axis of the imaging lens, and the object-side surface of the second lens is convex in the vicinity of the optical axis, and the image-side surface of the second lens is concave in the vicinity of the optical axis, and
    wherein an object-side surface and an image-side surface of the third lens are aspheric, and the third lens has positive power in the vicinity of the optical axis of the imaging lens, and the object-side surface of the third lens is convex in the vicinity of the optical axis, and the image-side surface of the third lens is concave in the vicinity of the optical axis, and wherein an object-side surface and an image-side surface of the fourth lens are aspheric, and the fourth lens has positive power in the vicinity of the optical axis of the imaging lens, and the object-side surface of the fourth lens is concave in the vicinity of the optical axis, and the image-side surface of the fourth lens is convex in the vicinity of the optical axis.

2. An imaging lens, as defined in claim 1, wherein when the focal length of the first lens is f1 and the focal length of the entire system of the imaging lens is f, the following formula (1) is satisfied:

$$-11.0 < f1/f < -8.0 \qquad (1).$$

3. An imaging lens, as defined in claim 1, wherein when a distance between the first lens and the second lens on the optical axis is d2, and a length from the vertex of the object-side surface of the first lens to an image plane is L, the following formula (2) is satisfied:

$$0.16 < d2/L < 0.30 \qquad (2).$$

4. An imaging lens, as defined in claim 1, wherein when a distance between the second lens and the third lens on the optical axis is d4 and a length from the vertex of the object-side surface of the first lens to an image plane is L, the following formula (3) is satisfied:

$$0.02 < d4/L < 0.05 \qquad (3).$$

5. An imaging lens, as defined in claim 1, wherein when the focal length of the second lens is f2 and the focal length of the third lens is f3, the following formula (4) is satisfied:

$$-1.2 < f2/f3 < -0.5 \qquad (4).$$

6. An imaging lens, as defined in claim 1, wherein when the combined focal length of the third lens and the fourth lens is f34 and a length from the vertex of the object-side surface of the first lens to an image plane is L, the following formula (5) is satisfied:

$$2.0 < L/f34 < 6.0 \qquad (5).$$

7. An imaging lens, as defined in claim 1, wherein when the paraxial curvature radius of the image-side surface of the second lens is r4 and the paraxial curvature radius of the object-side surface of the third lens is r5, the following formula (6) is satisfied:

$$1.0 < r5/r4 < 2.0 \qquad (6).$$

8. An imaging lens, as defined in claim 1, wherein the Abbe number of the material of the first lens for d-line is greater than or equal to 40, and wherein the Abbe number of the material of the second lens for d-line is greater than or equal to 50, and wherein the Abbe number of the material of the third lens for d-line is less than or equal to 40, and wherein the Abbe number of the material of the fourth lens for d-line is greater than or equal to 50.

9. An imaging lens, as defined in claim 1, wherein the full angle of view of the imaging lens is greater than 200°.

10. An imaging apparatus comprising an imaging lens as defined in claim 1.

* * * * *